United States Patent
Trevisani (10) Patent No.: US 12,144,697 B2
(45) Date of Patent: Nov. 19, 2024

(54) ELECTRIC TOOTHBRUSH

(71) Applicant: Andrea Trevisani, Turin (IT)

(72) Inventor: Andrea Trevisani, Turin (IT)

(*) Notice: Subject to any disclaimer, the term of this patent is extended or adjusted under 35 U.S.C. 154(b) by 640 days.

(21) Appl. No.: 17/052,089

(22) PCT Filed: Apr. 30, 2019

(86) PCT No.: PCT/IB2019/053519
§ 371 (c)(1),
(2) Date: Oct. 30, 2020

(87) PCT Pub. No.: WO2019/211737
PCT Pub. Date: Nov. 7, 2019

(65) Prior Publication Data
US 2021/0068529 A1 Mar. 11, 2021

(30) Foreign Application Priority Data

Apr. 30, 2018 (IT) .......................... 102018000004978

(51) Int. Cl.
*A61C 17/22* (2006.01)
*A46B 13/02* (2006.01)
(Continued)

(52) U.S. Cl.
CPC .......... *A61C 17/221* (2013.01); *A46B 13/026* (2013.01); *A61C 17/26* (2013.01);
(Continued)

(58) Field of Classification Search
CPC ..... A61C 17/24; A61C 17/26; A61C 17/3418; A61C 17/221; A61B 13/02; A61B 13/026
See application file for complete search history.

(56) References Cited

U.S. PATENT DOCUMENTS 3,161,899 A * 12/1964 Pierre .................... A61C 17/26
15/23
3,859,684 A * 1/1975 Moskwinski .......... A61C 17/26
15/23
(Continued)

FOREIGN PATENT DOCUMENTS

DE 1198783 B 8/1965
DE 3819249 * 12/1988 ............. A61C 17/26
(Continued)

OTHER PUBLICATIONS

International Search Report and Written Opinion, issued in PCT/IB2019/053519, mailed Aug. 21, 2019.

*Primary Examiner* — Laura C Guidotti
(74) *Attorney, Agent, or Firm* — ArentFox Schiff LLP; Michael Fainberg (57) ABSTRACT

An electric toothbrush includes a main body, a head connected to the main body, having a stem and a rotating element rotating in first and second rotation directions, a transmission shaft rotating the rotating element, a motor generating rotary motion transmitted via transmission shaft to the rotating element, and first, second and third push switches. Pressing the first switch, which is pressed when the transmission shaft is inclined in a first flexion direction, causes rotation of the rotating element in the first rotation direction. Pressing the second switch, which is pressed when the transmission shaft is inclined in a second flexion direction, causes rotation of the rotating element in the second rotation direction. Pressing the third switch, which is pressed by the transmission shaft when inclined with respect to the main body in a third flexion direction, causes rotation of the rotating element in the first or second rotation direction.

13 Claims, 6 Drawing Sheets

(51) Int. Cl.
*A61C 17/26* (2006.01)
*A61C 17/34* (2006.01)
*A46B 5/00* (2006.01)
*A46B 9/04* (2006.01)
*A46B 13/00* (2006.01)
*A46B 15/00* (2006.01)

(52) U.S. Cl.
CPC ........ *A61C 17/3418* (2013.01); *A46B 5/0058* (2013.01); *A46B 9/04* (2013.01); *A46B 13/001* (2013.01); *A46B 13/008* (2013.01); *A46B 15/0006* (2013.01)

(56) References Cited

U.S. PATENT DOCUMENTS 4,163,300 A * 8/1979 Quint .................. A46B 13/026
15/23
2014/0215732 A1 8/2014 Kiluk

FOREIGN PATENT DOCUMENTS

| FR | 2874499 | * | 3/2006 | ............. A61C 17/26 |
| JP | S5523191 U | | 2/1980 | |
| KR | 100896126 B1 | * | 5/2009 | ........... A46B 13/026 |

* cited by examiner

ELECTRIC TOOTHBRUSH

CROSS-REFERENCE TO RELATED APPLICATIONS

This application is a National Phase Application of PCT International Application No. PCT/IB2019/053519, having an International Filing Date of Apr. 30, 2019 which claims priority to Italian Application No. 102018000004978 filed Apr. 30, 2018, each of which is hereby incorporated by reference in its entirety.

FIELD OF THE INVENTION

The present invention is generally in the sector of oral hygiene devices: in particular, the invention refers to an electric toothbrush.

BACKGROUND OF THE INVENTION

The correct brushing action taught by dentists states that the lower teeth must always be brushed from the bottom to the top and the upper teeth from the top to the bottom, and the tooth plane, i.e. the chewing surface of the tooth, must be brushed transversely.

Electric toothbrushes made using the prior art usually have rotating heads that rotate alternately along two opposite rotation directions. Disadvantageously, since the rotation is not controlled according to any rule but is simply alternated in two possible directions, the current electric toothbrushes may be found to be in the condition of not performing the correct brushing action taught by dentists described above.

The action of the current electric toothbrushes thus does not satisfy the requirements for proper interdental cleaning and gingival massage, as required by dentists.

Currently, a correct brushing action may only be achieved by means of manual toothbrushes. Disadvantageously, the action of manual toothbrushes may ensure that only a moderate degree of dental hygiene is achieved with a considerable amount of time.

JPS5523191U describes an electric toothbrush for cleaning teeth with a rotating brush. However, the aforesaid problems remain unresolved.

SUMMARY OF THE INVENTION

One of the aims of the present invention is therefore to provide an electric toothbrush that can replace the correct use of the manual toothbrush, ensuring proper interdental cleaning and ensuring proper gingival massage as required by dentists.

The aforesaid and other objects and advantages are achieved, according to an aspect of the present invention, by an electric toothbrush as described and claimed herein. Preferred embodiments of the invention are also described.

BRIEF DESCRIPTION OF THE DRAWINGS

The functional and structural features of some preferred embodiments of an electric toothbrush according to the invention will now be described. Reference is made to the accompanying drawings, wherein.

DETAILED DESCRIPTION

Before explaining in detail a plurality of embodiments of the invention, it should be clarified that the invention is not limited in its application to the constructive details and to the configuration of the components presented in the following description or illustrated in the drawings. The invention may assume other embodiments and may in practice be implemented or achieved in different ways. It should also be understood that the phraseology and terminology have descriptive purposes and should not be construed as restrictive. The use of "include" and "comprise" and the variations thereof are to be understood as encompassing the elements stated hereinafter and the equivalents thereof, as well as additional elements and the equivalents thereof.

Figure 1:
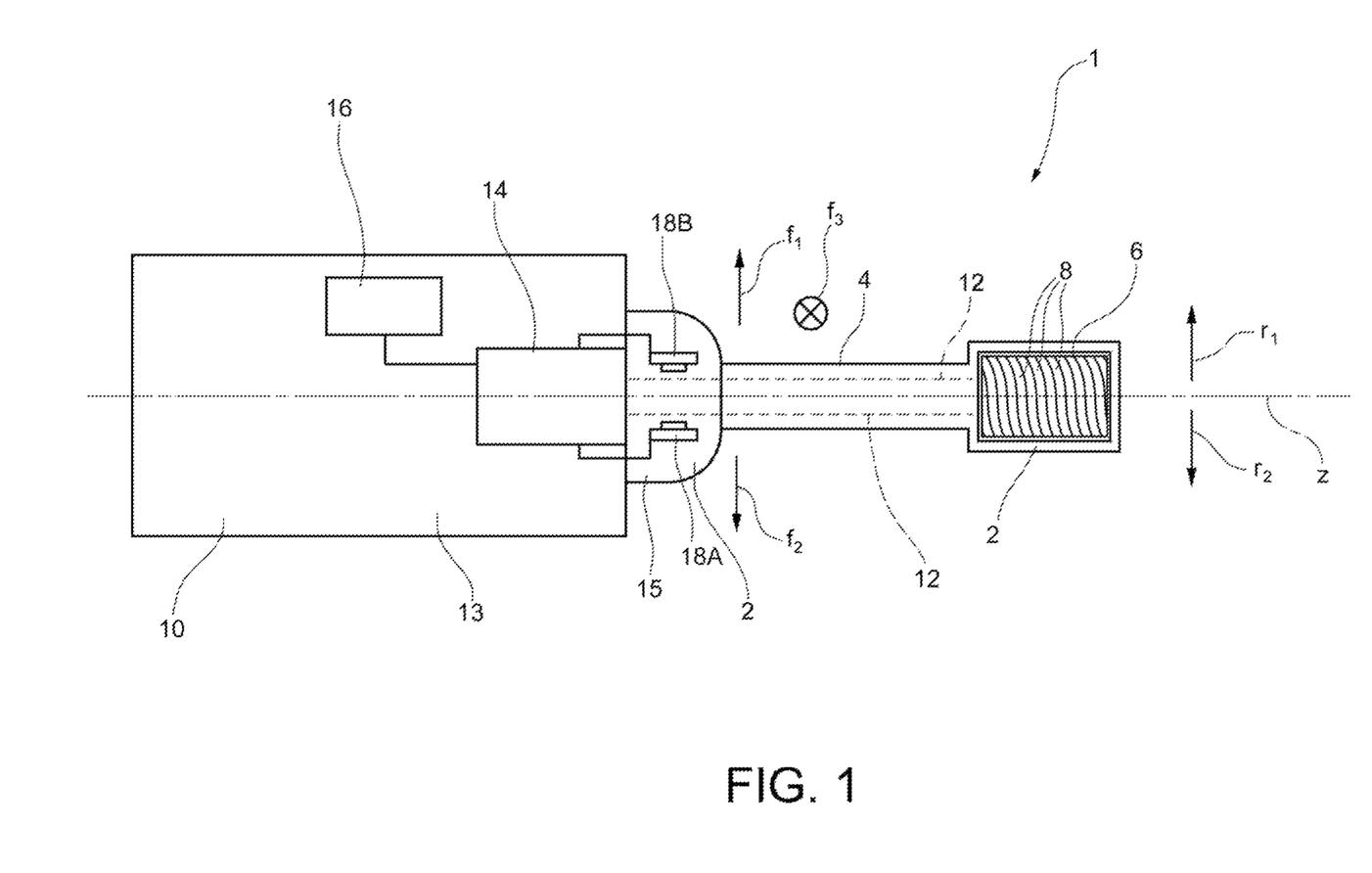
FIG. 1 illustrates a first embodiment of an electric toothbrush according to the present invention.

Initially making reference to FIG. 1, a first embodiment of an electric toothbrush according to the present invention is illustrated.

This electric toothbrush 1 is a toothbrush for cleaning the teeth that comprises a main body 10 and a head 2.

The head 2 comprises a stem 4 and a rotating element 6, arranged at one end of said stem 4.

The rotating element 6 includes a plurality of bristles 8 and is adapted to rotate according to two opposite rotation directions, in particular a first rotation direction r1 and a second rotation direction r2 opposite to said first rotation direction r1.

The head 2 is connected to said main body 10 in an articulated manner.

The electric toothbrush 1 further comprises a transmission shaft 12, at least partially housed in the stem 4 of the head 2. The transmission shaft 12 is provided to rotate the rotating element 6 of the head 2.

The rotating element 6 may rotate around a rotation axis perpendicular to an axis of the transmission shaft 12.

Moreover, the electric toothbrush 1 includes a motor 14 powered by a power supply means 16 and adapted to generate a rotary motion to be transmitted via the transmission shaft 12 to the rotating element 6 of the head 2 so as to generate a rotation of said rotating element 6 according to the first rotation direction r1 and the second rotation direction r2. This motor 14 and the power supply means 16 are arranged within the main body 10.

The electric toothbrush 1, as may be seen in FIG. 1, comprises a first push switch 18A provided to detect a relative inclination of the head 2 relative to the main body 10 according to a first flexion direction f1. This first push switch 18A is arranged around the transmission shaft 12 in such a way that the first push switch 18A is pressed by the transmission shaft 12 when the latter is inclined relative to the main body 10 according to the first flexion direction f1. Pressing the first push switch 18A causes a rotation of the rotating element 6 of the head 2 according to the first rotation direction r1 via the motor 14.

The electric toothbrush 1 comprises moreover a second push switch 18B provided to detect a relative inclination of the head 2 with respect to the main body 10 according to a second flexion direction f2, opposite to said first flexion direction f1. The second push switch 18B is arranged around the transmission shaft 12 in such a way that the second push switch 18B is pressed by the transmission shaft 12 when the latter is inclined with respect to the main body 10 according to the second flexion direction f2. Pressing the second push switch 18B causes a rotation of the rotating element 6 of the head 2 according to the second rotation direction r2 via the motor 14.

Figure 4:
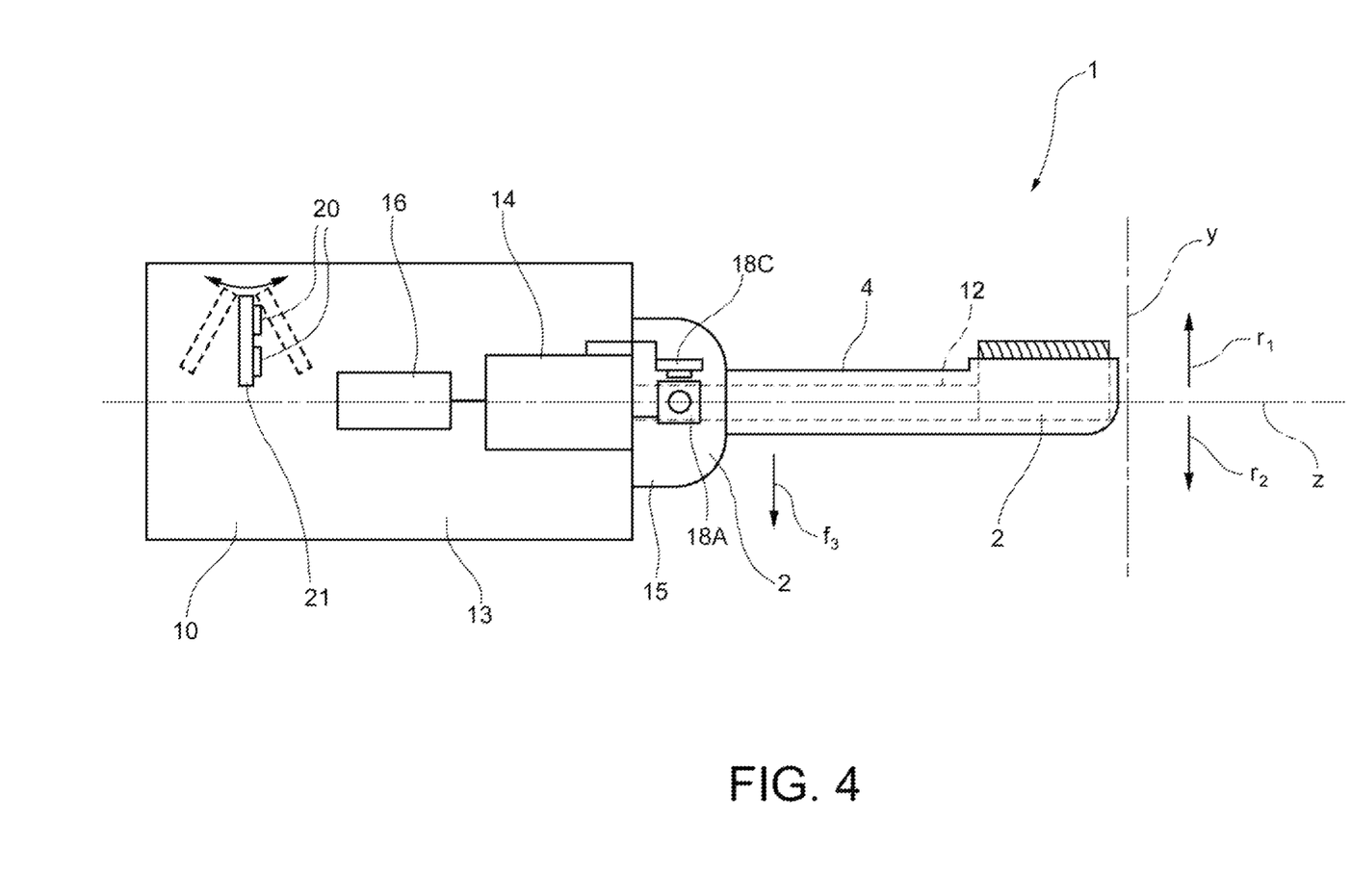
FIG. 4 is a side view of the electric toothbrush in FIG. 1.
Figure 5:
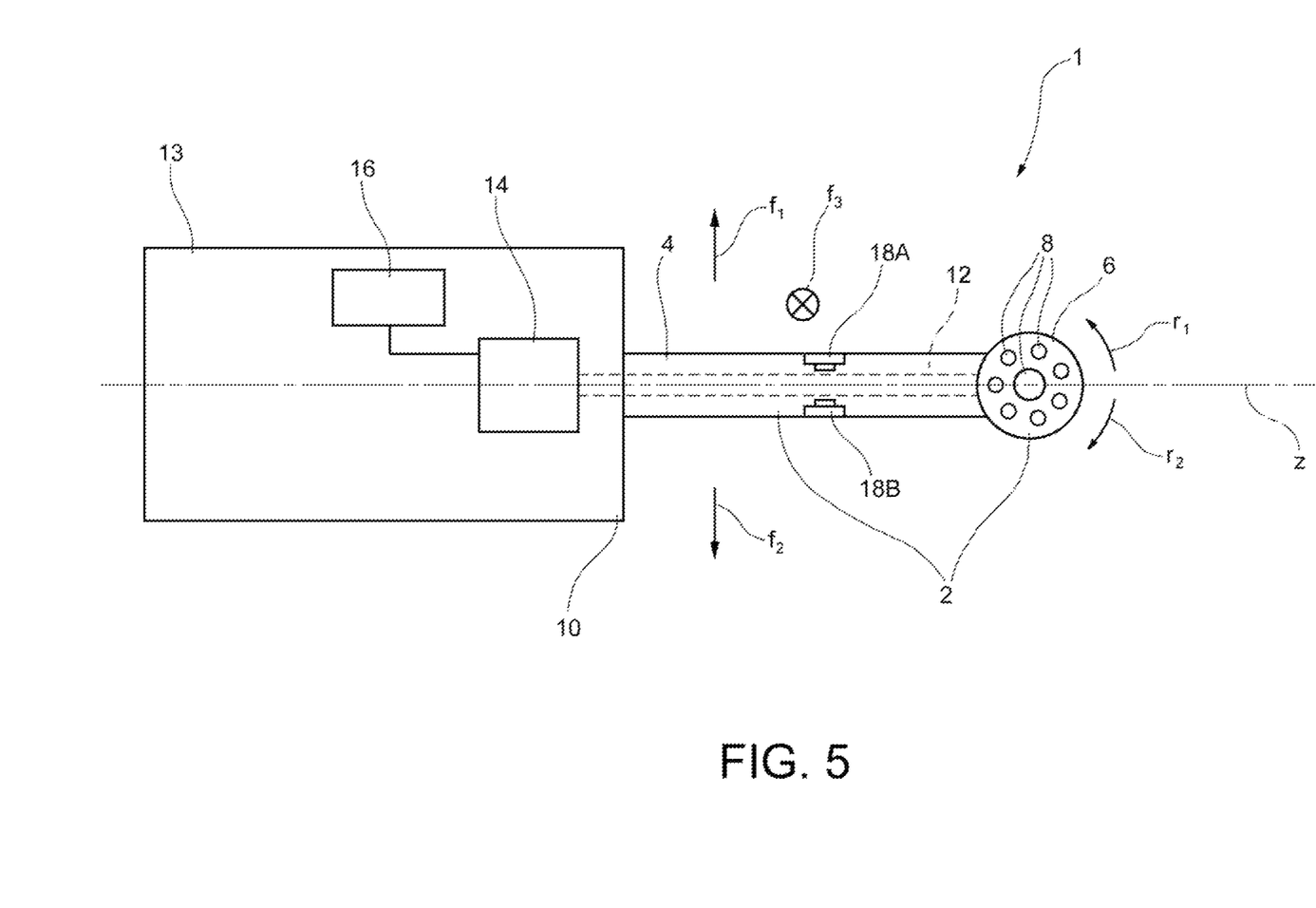
FIG. 5 illustrates a second embodiment of the electric toothbrush.
Figure 6:
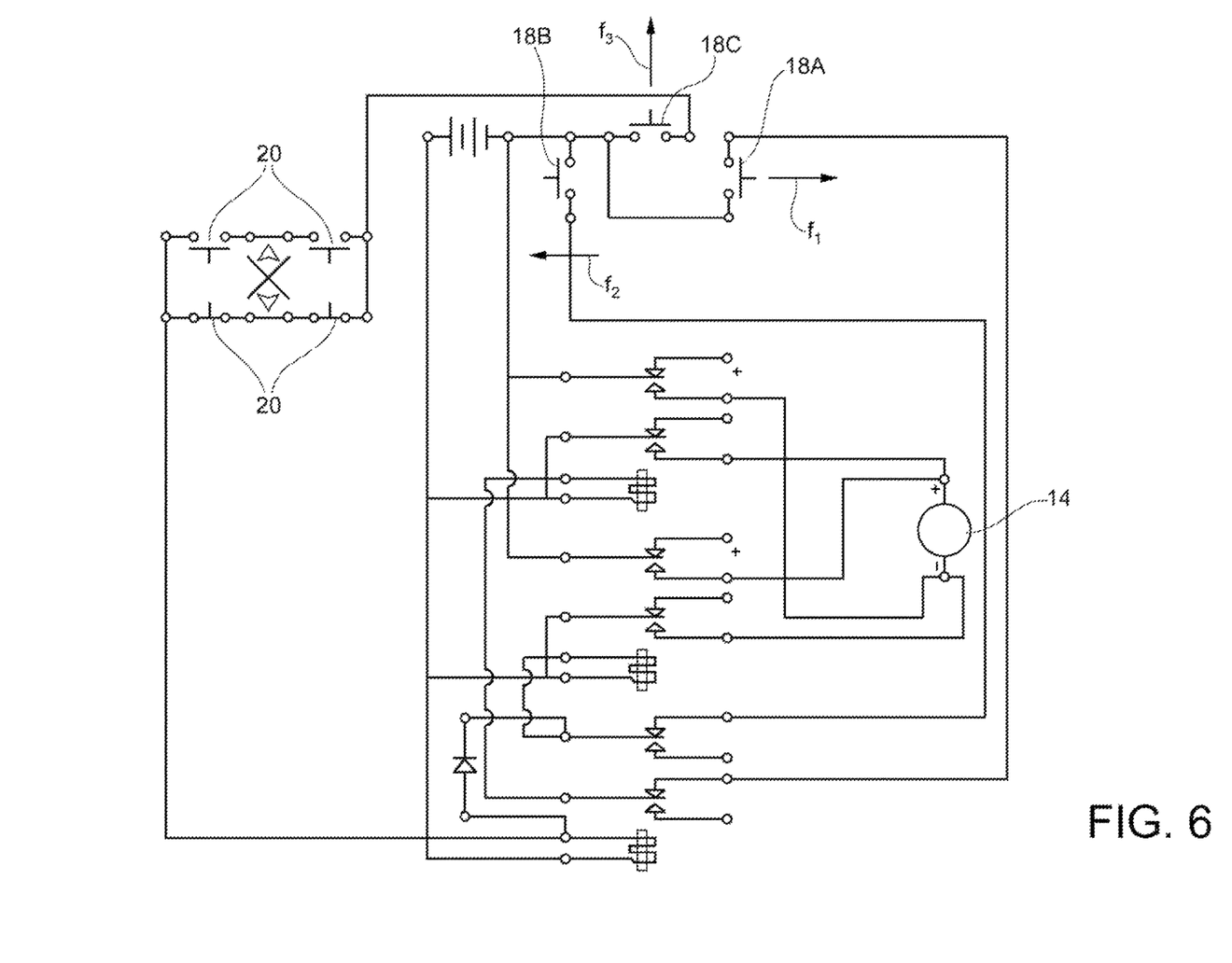
FIG. 6 illustrates an exemplifying circuit diagram that may be used within the electric toothbrush.

Still further, as seen in FIG. 4, the electric toothbrush 1 also comprises a third push switch 18C provided to detect a relative inclination of the head 2 with respect to the main body 10 according to a third flexion direction f3. The third flexion direction f3 is substantially perpendicular to said first flexion direction f1 and said second flexion direction f2. The third push switch 18C is arranged around the transmission shaft 12 in such a way that the third push switch 18C is pressed by the transmission shaft 12 when the latter is inclined with respect to the main body 10 according to the third flexion direction f3. Pressing the third push switch 18C causes a rotation of the rotating element 6 of the head 2 according to the first rotation direction r1 or the second rotation direction r2, via the motor 14.

In this case, it is not important if the rotating element rotates according to the first or second rotation direction r1, r2, since this condition is provided for cleaning the chewing plane of the teeth.

The third push switch 18C may be placed on a side of the transmission shaft 12 facing the third flexion direction f3 or a direction opposite to the third flexion direction f3.

Figure 2:
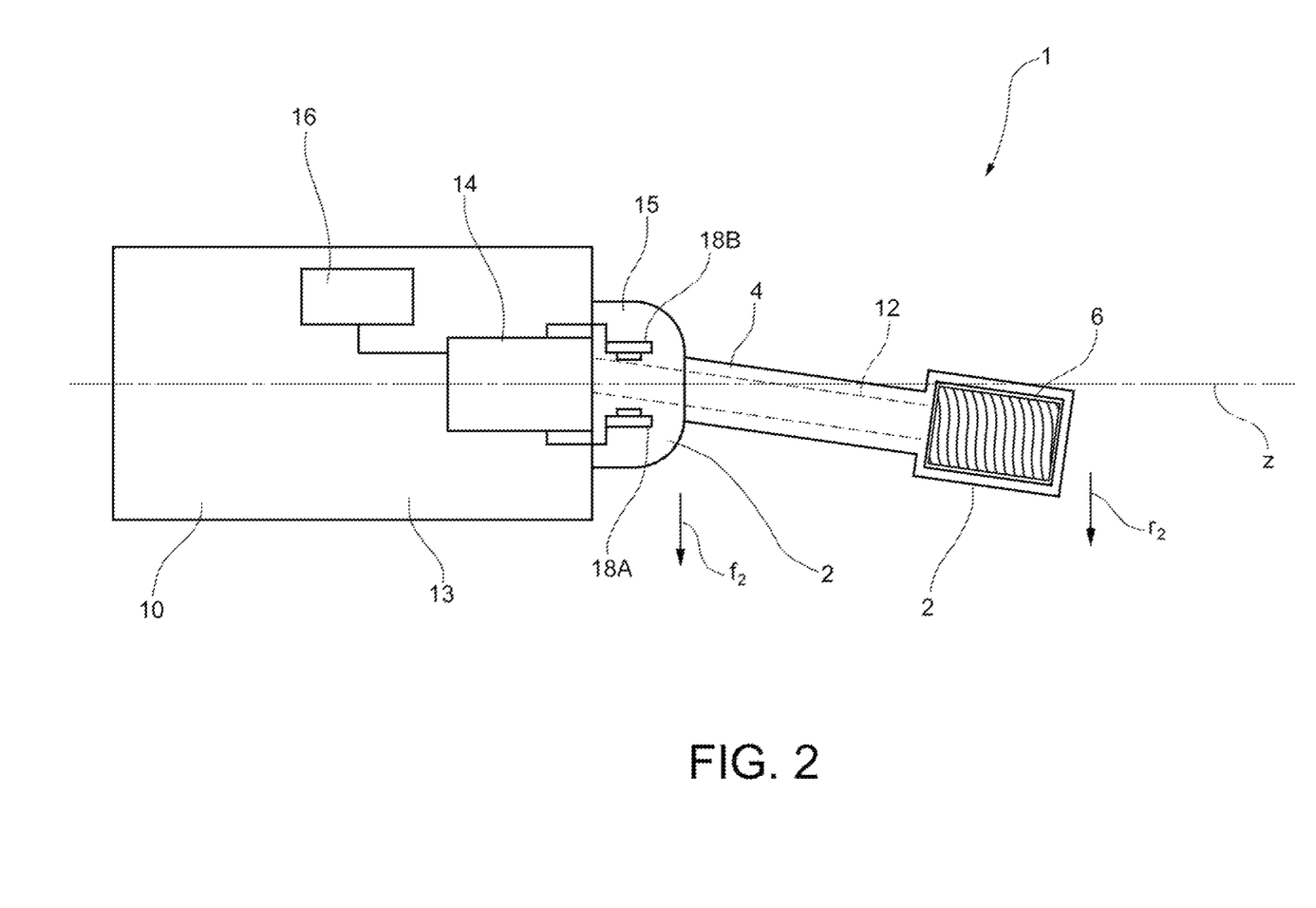
FIG. 2 illustrates the electric toothbrush in FIG. 1, wherein the head of the electric toothbrush is made to flex, for example, according to a flexion direction, and presses the push switch located at the top in the figure.

With reference to FIG. 2, in one embodiment, the first push switch 18A may be placed on a side of the transmission shaft 12 facing the first flexion direction f1 and the second push switch 18B may be placed on a side of the transmission shaft 12 facing the second flexion direction f2. According to this arrangement, when the head 2 is flexed downwards, the second push switch 18B will be pressed, and vice versa.

In this case, the pressure of the switches depends on the pivot point.

Figure 3:
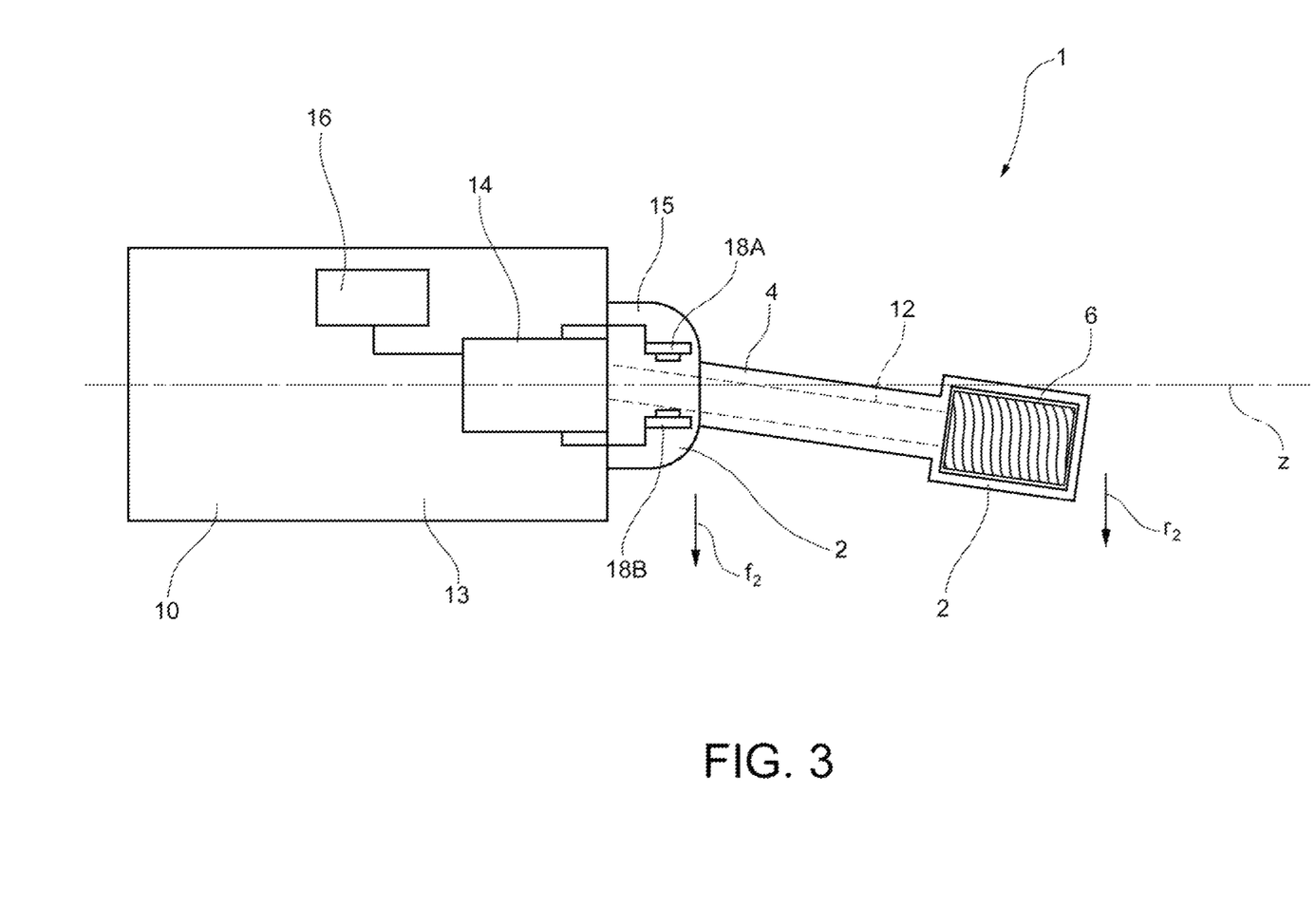
FIG. 3 shows an electric toothbrush wherein the head of the electric toothbrush is made to flex, for example, according to a flexion direction, and presses the push switch located at the bottom in the figure.

Otherwise, with reference to FIG. 3, in a further embodiment, the first push switch 18A may be placed on a side of the transmission shaft 12 facing the second flexion direction f2 and the second push switch 18B may be placed on a side of the transmission shaft 12 facing the first flexion direction f1. According to this arrangement, when the head 2 is flexed upwards, the first push switch 18A will be pressed, and vice versa.

For example, the push switches may be standard switches, push-button switches or micro-switches.

Still by way of example, as may be observed from FIGS. 1-3, the rotating element 6 may be a cylindrical brush with bristles orthogonal to the axis z. In other words, the rotating element may have a roller shape. With reference to FIG. 4, on the other hand, the rotating element 6 may have a circular structure with bristles emerging from only one of the surfaces of the said circular structure.

Still referring to the figures, the main body 10 may comprise an elongated section 13 and a dome section 15. The dome section 15 may have an opening for the passage of the transmission shaft 12. Within the dome section 15 there may be placed said push switches 18A, 18B, 18C. The elongated section 13 and the dome section 15 may be made in one piece or made separately and subsequently assembled together. In addition, the elongated section 13 and the dome section 15 may be made by molding a plastic material or by forming a metal material, such as aluminum. For example, the elongated section may be cylindrical or polygonal in shape or any shape that may facilitate the grip by a user.

Making a practical example of use of the electric toothbrush 1, the latter may begin its action as soon as it is positioned, for example, in the left outer part of the lower dental arch, and, to avoid splashes, the lips are half-closed. At that moment, the slight upward flexion of the stem will activate the second push switch 18B, which will signal to the motor 14 to rotate the rotating element 6 counterclockwise, i.e., the rotating element 6 will brush the teeth and gums from bottom to top. Continuing the action and moving the electric toothbrush onto the chewing plane of the teeth, the third push switch 18C dedicated to this position will be activated, rotating the rotating element in one of the two possible directions r1 or r2.

Rotating again another 90°, the toothbrush finds itself in the inner left part of the lower dental arch. At that moment, the slight flexion of the stem, opposite to the flexion detected when the toothbrush is in the outer left part of the lower dental arch, will activate the second push switch 18B, which will signal to the motor 14 to rotate the rotating element 6 clockwise. In this way, the brushing will again be from the bottom to the top. The operation, which will be repeated in the four portions of the teeth, will thus find the appliance in any case with the correct rotation direction, in order to always brush the teeth from the bottom to the top.

As illustrated for example in FIG. 4, the electric toothbrush 1 may comprise a plurality of inclination switches 20 provided to detect a rotation of the electric toothbrush 1, from a first predetermined position to a second predetermined position, around a longitudinal axis z of the electric toothbrush 1.

In the present description and in the claims, the term and the expressions indicating "longitudinal" positions and orientations shall be understood as substantially parallel to the direction of the axis of the transmission shaft 12. Moreover, the term and the expressions indicating "transverse" positions and orientations shall be understood as substantially perpendicular to the direction of the axis of rotation of the rotating element 6.

The second predetermined position is rotated substantially +90° or −90° with respect to the first predetermined position.

When the electric toothbrush 1 is determined to be in the first predetermined position, even if the third push switch 18C is pressed by the stem 4 of the head 2, the latter cannot cause a rotation of the rotating element 6 via the motor 14. Only pressing the first push switch 18A or the second push switch 18B may cause a rotation of the rotating element 6 via said motor 14.

When, on the other hand, the electric toothbrush 1 is determined to be in the second predetermined position, even if the first push switch 18A and/or the second push switch 18B is/are pressed, they cannot cause a rotation of the rotating element 6 via the motor 14. Only pressing the third push switch 18C may cause a rotation of the rotating element 6 via said motor 14.

For example, referring to FIGS. 1 and 4, FIG. 1 illustrates the electric toothbrush in the first predetermined position, and FIG. 4 illustrates the toothbrush in the second predetermined position.

The first predetermined position is provided for cleaning the side walls of the teeth, whereby a flexion of the head 2, and consequently of the transmission shaft 12, according to the third flexion direction f3 is not only not necessary, but must also be excluded from detection as it could lead the motor to be controlled in a contrasting manner if a flexion according to the third flexion direction f3 is also detected. For this reason, the push switch 18C provided to detect a flexion according to the third flexion direction f3 is disabled and is not used to detect a possible flexion.

Conversely, the second predetermined position is provided for cleaning the chewing plane of the teeth, whereby flexions of the head 2, and consequently of the transmission shaft 12, according to the first or second flexion direction are not only unnecessary, but must also be excluded from detection as they could lead the motor to be controlled in a contrasting manner if a flexion according to the first and second flexion direction is also detected. For this reason, the push switches 18A, 18B provided to detect flexion according the first or second flexion direction are disabled and are not used to detect a possible flexion.

The following solution may be used to disable these switches.

The electric toothbrush 1 may comprise a first relay to disconnect the first push switch 18A from the motor 14 and a second relay to disconnect the second push switch 18B from the motor 14.

The first push switch 18A and the second push switch 18B are disconnected from the motor 14 by means of said first relay and second relay when the electric toothbrush 1 is detected to be in said second position by the inclination switches 20, so that the first push switch 18A and the second push switch 18B cannot cause the rotation of the rotating element 6.

The electric toothbrush 1 may further comprise a third relay adapted to disconnect the third push switch 18C from the motor 14.

The third push switch 18C is disconnected from the motor 14 when the electric toothbrush 1 is detected to be in said first position by the inclination switches 20, so that the third push switch 18C cannot cause the rotation of the rotating element 6 via the motor 14.

Referring to FIG. 4, the electric toothbrush may further comprise an oscillating support 21 whereon is mounted the plurality of inclination switches 20.

The oscillating support 21 may be a simple circuit board hinged at one end to the main body 10.

The oscillating support is adapted to allow the correct functioning of the inclination switches 20 even when the electric toothbrush is inclined with respect to a transverse axis y perpendicular to said longitudinal axis z.

This situation may occur when a user bends over a washbasin while brushing his/her teeth.

This oscillating support 21 allows for this inclination to be compensated and ensures the correct operation of the inclination switches 20.

In an alternative embodiment not illustrated in the figures, the push switches 18A, 18B, 18C, instead of being housed in the main body 10 of the toothbrush 1, are arranged within the stem 4 of the head 2, around the transmission shaft 12. In this case, the stem is made of flexible material. The flexion of the same stem will press one of the push switches in the event of a flexion thereof.

In any one of the preceding embodiments, the head 2 may be removably coupled to the main body 10, and/or the rotating element 6 may be removably coupled to the stem 4 of the head 2.

Preferably, the periodic replacement of the rotated element 6 alone is a more economical solution and does not compromise the articulated part between the main body 10 and the head 2. The articulated part is a point that requires a very precise coupling to guarantee the flexibility required for the stem of the head and, at the same time, the water-tightness of the main body 10.

Moreover, the power supply means 16 may be one or more classic replaceable batteries or a rechargeable battery.

Still further, the electric toothbrush may comprise an annular gasket, or a bellows, arranged at the point of connection of the head 2 with the main body 10. Such an annular gasket, or bellows, is adapted to allow the flexion of the head 2 with respect to the main body 10 and to guarantee the water seal of the main body 10.

The annular gasket may be, for example, an O-ring.

The advantage granted by the present invention is thus to provide an electric toothbrush that may replace the correct use of a manual toothbrush, ensuring proper interdental cleaning and ensuring proper gingival massage as required by dentists.

Moreover, due to the rotation speed of the rotating element of the electric toothbrush, the number of bristles passing through the teeth and gums is several times higher than that achievable using a normal manual toothbrush. This results in an intense gingival massage, with guide to cover the neck of the tooth, which is a very useful action in the treatment of "pyorrhea" and a better use of the properties of the toothpaste used, cleaning the teeth more thoroughly. In addition, there will be an action very similar to that carried out by interdental floss because the improved brushing capacity of the inner part and the chewing plane allows the use thereof to be reduced, if not eliminated, with significant time savings.

Various aspects and embodiments of an electric toothbrush according to the invention have been described. It is understood that each embodiment may be combined with any other embodiment. The invention, moreover, is not limited to the described embodiments, but may vary within the scope defined by the accompanying claims.

The invention claimed is:

1. An electric toothbrush for teeth cleaning, comprising:
a main body;
a head comprising a stem and a rotating element, arranged at one end of said stem, the rotating element including a plurality of bristles and being able to rotate according to a first rotation direction and a second rotation direction opposite to said first rotation direction, said head being connected to said main body in an articulated manner;
a transmission shaft at least partially located in the stem of the head and provided to rotate the rotating element of the head;
a motor powered by a power supply means and adapted to generate a rotary motion transmissible through the transmission shaft to the rotating element of the head, so as to generate rotation of said rotating element according to the first rotation direction and the second rotation direction; the motor and the power supply means being arranged inside the main body;
said electric toothbrush further comprising:
a first push switch provided to detect a relative inclination of the head with respect to the main body in accordance with a first flexion direction, the first push switch being arranged around the transmission shaft so that the first push switch is pressed by the transmission shaft when the transmission shaft is inclined with respect to the main body according to the first flexion direction, where pressing of the first push switch causes rotation of the rotating element of the head according to the first rotation direction via the motor;

a second push switch provided to detect a relative inclination of the head with respect to the main body in accordance with a second flexion direction, opposite to said first flexion direction; the second push switch being arranged around the transmission shaft so that the second push switch is pressed by the transmission shaft when the transmission shaft is inclined with respect to the main body according to the second flexion direction, pressing of the second push switch causing rotation of the rotating element of the head according to the second rotation direction via the motor;

a third push switch provided to detect a relative inclination of the head with respect to the main body according to a third flexion direction perpendicular to said first flexion direction and said second flexion direction, the third push switch being arranged around the transmission shaft so that the third push switch is pressed by the transmission shaft when the transmission shaft is inclined with respect to the main body according to the third flexion direction, pressing of the third push switch causing rotation of the rotating element of the head according to the first rotation direction or the second rotation direction via the motor;

a plurality of inclination switches provided to detect rotation of the electric toothbrush from a first predetermined position to a second predetermined position around an axis (z) longitudinal to the electric toothbrush, the second predetermined position being rotated by +90° or −90° with respect to the first predetermined position;

wherein, when the electric toothbrush is in the first predetermined position, even if the third push switch is pressed, the third push switch not causing rotation of the rotating element via the motor, and pressing of the first push switch or of the second push switch causing rotation of the rotating element via said motor; and wherein, when the electric toothbrush is in the second predetermined position, even if the first push switch and/or the second push switch is/are pressed, rotation of the rotating element not being caused via the motor, and pressing of the third push switch causing rotation of the rotating element via said motor.

2. The electric toothbrush of claim 1, wherein the first push switch is placed on a side of the transmission shaft facing the first flexion direction and the second push switch is placed on a side of the transmission shaft facing the second flexion direction.

3. The electric toothbrush of claim 1, wherein the third push switch is placed on a side of the transmission shaft facing the third flexion direction or a direction opposite to the third flexion direction.

4. The electric toothbrush of claim 1, further comprising:
a first relay adapted to disconnect the first push switch from the motor and a second relay adapted to disconnect the second push switch from the motor, the first push switch and the second push switch being disconnected from the motor by said first relay and second relay when the electric toothbrush is detected to be in said second predetermined position by the plurality of inclination switches, so that the first push switch and the second push switch do not cause the rotation of the rotating element; and
a third relay adapted to disconnect the third push switch from the motor, the third push switch being disconnected from the motor when the electric toothbrush is detected to be in said first predetermined position by the plurality of inclination switches, so that the third push switch does not cause rotation of the rotating element.

5. The electric toothbrush of claim 1, wherein the first, second and third push switches are arranged inside the main body.

6. The electric toothbrush of claim 1, further comprising:
an oscillating support on which the plurality of inclination switches is mounted, the oscillating support allowing correct operation of the plurality of inclination switches even when the electric toothbrush is inclined with respect to a transverse axis (y) perpendicular to said longitudinal axis (z).

7. The electric toothbrush of claim 1, wherein the head is removably coupled to the main body.

8. The electric toothbrush of claim 1, wherein the power supply means is a battery or a rechargeable battery.

9. The electric toothbrush of claim 1, further comprising an annular gasket, or a bellows, arranged at a connection point of the head with the main body and adapted to allow flexion of the head with respect to the main body and to guarantee water seal of the main body.

10. The electric toothbrush of claim 1, wherein the rotating element is a cylindrical brush with bristles orthogonal to the longitudinal axis (z).

11. The electric toothbrush of claim 1, wherein the first push switch is placed on a side of the transmission shaft facing the second flexion direction and the second push switch is placed on a side of the transmission shaft facing the first flexion direction.

12. The electric toothbrush of claim 1, wherein the rotating element is removably coupled to the stem of the head.

13. An electric toothbrush for teeth cleaning, comprising:
a main body;
a head comprising a stem and a rotating element, arranged at one end of said stem, the rotating element including a plurality of bristles and being able to rotate according to a first rotation direction and a second rotation direction opposite to said first rotation direction, said head being connected to said main body in an articulated manner;
a transmission shaft at least partially located in the stem of the head and provided to rotate the rotating element of the head;
a motor powered by a power supply means and adapted to generate a rotary motion transmissible through the transmission shaft to the rotating element of the head, so as to generate rotation of said rotating element according to the first rotation direction and the second rotation direction; the motor and the power supply means being arranged inside the main body;
said electric toothbrush further comprising:
a first push switch provided to detect a relative inclination of the head with respect to the main body in accordance with a first flexion direction, the first push switch being arranged around the transmission shaft so that the first push switch is pressed by the transmission shaft when the transmission shaft is inclined with respect to the main body according to the first flexion direction, where pressing of the first push switch causes rotation of the rotating element of the head according to the first rotation direction via the motor;
a second push switch provided to detect a relative inclination of the head with respect to the main body in accordance with a second flexion direction, opposite to said first flexion direction; the second push switch being arranged around the transmission shaft so that the second push switch is pressed by the transmission shaft when the transmission shaft is inclined with respect to the main body according to the second flexion direction, pressing of the second push switch causing rotation of the rotating element of the head according to the second rotation direction via the motor; and a third push switch provided to detect a relative inclination of the head with respect to the main body according to a third flexion direction perpendicular to said first flexion direction and said second flexion direction, the third push switch being arranged around the transmission shaft so that the third push switch is pressed by the transmission shaft when the transmission shaft is inclined with respect to the main body according to the third flexion direction, pressing of the third push switch causing rotation of the rotating element of the head according to the first rotation direction or the second rotation direction via the motor, wherein the first, second and third push switches are arranged inside the stem of the head, the stem being made of flexible material.

* * * * *